(12) United States Patent
Fehn

(10) Patent No.: US 6,868,373 B2
(45) Date of Patent: Mar. 15, 2005

(54) METHOD OF INITIALIZING A SIMULATION OF THE BEHAVIOR OF AN INDUSTRIAL PLANT, AND SIMULATION SYSTEM FOR AN INDUSTRIAL PLANT

(75) Inventor: Thomas Fehn, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/026,265

(22) Filed: Dec. 21, 2001

(65) Prior Publication Data
US 2004/0073409 A1 Apr. 15, 2004

Related U.S. Application Data

(63) Continuation-in-part of application No. 09/358,288, filed on Jul. 21, 1999, now abandoned, which is a continuation of application No. PCT/DE98/00047, filed on Jan. 8, 1998.

(30) Foreign Application Priority Data

Jan. 21, 1997 (DE) .......................... 197 01 928

(51) Int. Cl.$^7$ .............................. G06G 7/48; G06F 7/60; G06F 15/00; G05B 13/02
(52) U.S. Cl. ................. 703/3; 703/6; 700/28; 700/29; 700/30; 700/31; 702/182; 702/183
(58) Field of Search .............................. 703/2, 6, 9, 10, 703/11, 12; 700/28, 29, 30, 31; 702/182, 183, 196

(56) References Cited

U.S. PATENT DOCUMENTS

| | | | | |
|---|---|---|---|---|
| 3,721,070 A | * | 3/1973 | Fesco .......................... | 57/411 |
| 4,349,869 A | * | 9/1982 | Prett et al. .................... | 700/36 |
| 4,613,952 A | | 9/1986 | McClanahan .................. | 703/6 |
| 4,885,706 A | | 12/1989 | Pate et al. .................... | 703/6 |
| 4,928,484 A | | 5/1990 | Peczkowski ................. | 60/240 |

(List continued on next page.)

FOREIGN PATENT DOCUMENTS

DE 42 03 432 A 4/1993

OTHER PUBLICATIONS

Patent Abstracts of Japan No. 09–330308 (Hideaki), dated Dec. 22, 1997.

*Primary Examiner*—W. D. Thomson
(74) *Attorney, Agent, or Firm*—Laurence A. Greenberg; Werner H. Stemer; Ralph E. Locher

(57) ABSTRACT

During an initialization of a simulation of the behavior of an industrial plant containing a number of components, a particularly reliable parameter input is intended to be ensured with a particularly low outlay. To this end, in an initialization method provision is made, according to the invention, that for each component a component type is identified in each case and, in circuit terms, is characterized by a number of inputs and by a number of outputs for one parameter in each case. The initialization method uses a stored component-type-specific signal flow structure for the parameter of each output for specifying whether a parameter input is requested for a component.

6 Claims, 4 Drawing Sheets

U.S. PATENT DOCUMENTS

| | | | | |
|---|---|---|---|---|
| 4,935,886 A | * | 6/1990 | Choka | 703/6 |
| 4,937,763 A | * | 6/1990 | Mott | 702/183 |
| 4,975,865 A | | 12/1990 | Carrette et al. | 700/10 |
| 5,006,992 A | | 4/1991 | Skeirik | 706/58 |
| 5,081,591 A | * | 1/1992 | Hanway et al. | 323/205 |
| 5,091,843 A | | 2/1992 | Peczkowski | 700/30 |
| 5,408,638 A | | 4/1995 | Sagawa et al. | 703/2 |
| 5,490,095 A | | 2/1996 | Shimada et al. | 703/14 |
| 5,541,849 A | | 7/1996 | Rostoker et al. | 716/18 |
| 5,544,066 A | | 8/1996 | Rostoker et al. | 716/18 |
| 5,555,201 A | | 9/1996 | Dangelo et al. | 716/1 |
| 5,557,531 A | | 9/1996 | Rostoker et al. | 716/1 |
| 5,557,533 A | | 9/1996 | Koford et al. | 716/13 |
| 5,572,436 A | | 11/1996 | Dangelo et al. | 716/18 |
| 5,598,344 A | | 1/1997 | Dangelo et al. | 716/18 |
| 5,636,125 A | | 6/1997 | Rostoker et al. | 700/121 |
| 5,646,869 A | | 7/1997 | Kaneko | 703/2 |
| 5,732,192 A | | 3/1998 | Malin et al. | 703/2 |
| 5,794,224 A | * | 8/1998 | Yufik | 706/14 |
| 5,826,065 A | | 10/1998 | Hinsberg, III et al. | 703/6 |
| 5,864,782 A | | 1/1999 | Mederer et al. | 702/183 |
| 5,999,894 A | | 12/1999 | Mederer et al. | 702/182 |
| 6,110,214 A | * | 8/2000 | Klimasauskas | 703/2 |
| 6,278,962 B1 | * | 8/2001 | Klimasauskas et al. | 703/2 |
| 6,714,899 B2 | * | 3/2004 | Kassmann | 703/2 |
| 6,721,610 B2 | * | 4/2004 | Gade et al. | 700/28 |

* cited by examiner

METHOD OF INITIALIZING A SIMULATION OF THE BEHAVIOR OF AN INDUSTRIAL PLANT, AND SIMULATION SYSTEM FOR AN INDUSTRIAL PLANT

CROSS-REFERENCE TO RELATED APPLICATION

This continuation-in-part application claims the benefit of U.S. application Ser. No. 09/358,288, filed Jul. 21, 1999, now abandoned which was a continuation of copending International Application PCT/DE98/00047, filed on Jan. 8, 1998 which designated the United States.

BACKGROUND OF THE INVENTION

Field of the Invention

The invention relates to a method of initializing a simulation of the behavior of an industrial plant containing a number of components. It also relates to a simulation system for carrying out the method.

In the planning of a complex industrial plant, for example of a power station plant, the most accurate knowledge of the plant behavior in various operating states and even during accident or fault situations is required. For an analysis of the plant behavior, a simulation method can indicate scenarios in which chosen situations are prescribed. In this case, the simulation may describe the entire plant or else only a partial system, for its part containing a number of components, of the plant. A complex industrial plant, which usually contains a large number of components, or else a partial system thereof is in this case simulated using the behavior of its components.

In the simulation of an industrial plant having a number of components, the basis is usually an interaction between the components, which describes an exchange of process parameters between the components in a suitable way. For instance, for a power station plant provision can be made for the interaction between a "blower" component and a "chimney" component to be described via a gas flow guided from the blower to the chimney. Suitable parameters for describing the gas flow can in this case be, for example, its temperature, its mass flow and a pressure loss.

The initialization of the simulation of a complex industrial plant is normally carried out by each component of the plant being initialized. To this end, starting values are in each case entered for the parameters of all the components. Here, the input of a particularly large number of starting values for various types of parameters are required. In this case it is usual that, for each component of the industrial plant to be simulated, starting values are input for all the parameters defining the interaction of one component with other components. For example, in the case of an industrial plant having a chimney connected downstream of a blower, provision could in this case be made that, during the initialization of the simulation, starting values for the temperature, the mass flow and the pressure of the gas flow leaving the blower, and starting values for the temperature, the mass flow and the pressure of the gas flow arriving at the chimney are to be entered. For the initialization, for example, it is possible for numerical methods to be used, but convergence problems can occur with these.

During such an initialization of the simulation for the industrial plant, an inconsistency in the data is possible in the event of faulty parameter input. This can lead to incorrect simulation results or the failure of the simulation method. In addition, an initialization of this type is particularly complicated, in particular in the case of a complex industrial plant, such as a power station plant, for example, having a large number of components.

SUMMARY OF THE INVENTION

It is accordingly an object of the invention to provide a method of initializing a simulation of the behavior of an industrial plant, and simulation system for an industrial plant which overcome the above-mentioned disadvantages of the prior art methods and devices of this general type, in which a particularly reliable parameter input is made possible with a particularly low effort. Furthermore, it is intended to specify a simulation system for an industrial plant that is particularly suitable for carrying out the method.

With the foregoing and other objects in view there is provided, in accordance with the invention, a method of initializing a simulation of a behavior of an industrial plant having a number of components, which includes identifying, for each component, a component type defined in circuit terms by a number of inputs and by a number of outputs for one parameter using a stored dependence matrix describing a component-type-specific signal flow structure for a parameter of each of the number of outputs to determine for each of the number of outputs which parameters cannot be derived from other parameters to be fed to the component; and entering only those parameters which cannot be derived from the others parameters to be fed to the component.

In this case, the invention is based on the consideration that, for a particularly reliable and intrinsically consistent parameter input, redundant input operations for parameters should be avoided as far as possible. To this end, each parameter should have to be entered only during the initialization of a single component, and then in the case of other components during whose initialization the parameter is also needed, it should be provided automatically. In order to avoid the redundant input or multiple input of a parameter, a check should in this case be made for each parameter that is relevant for a component as to whether a parameter input is required, or whether the parameter can be derived from other parameters to be fed to the component. A check of this type can be carried out with particularly simple method when the components to be worked on are characterized (defined), from the point of view of their circuit properties, using component types. For a particularly low effort in terms of computing, the specification as to whether a parameter input is required can in this case be performed using the stored dependence matrix describing a component-type-specific signal flow structure.

A component-type-specific signal flow structure is in this case understood to be a data set in the manner of a data sheet, which specifies for the respective component type what inputs and what outputs this component type has for which parameters. In addition, the data set specifies, for the parameter of each output, on which further parameters it depends. It is in particular possible to specify here whether the parameter of an output is completely determined by the parameters of the inputs to this component. If this is the case, then no parameter input is required for the parameter of this output. In this case, only the knowledge of the parameters at the main inputs of the component are required for complete initialization, these parameters in each case being able to be ascertained from the further components for their part connected upstream of the respective input. Parameters can in this case be understood to include, for example, a physical measured variable describing a mass flow, or else signals or messages of a general type to be transmitted.

The signal flow structure for each component type is expediently stored in the form of a dependence matrix. A dependence matrix of this type may, for example, represent in its columns the inputs and in its rows the outputs of the respective component type. In the event that the parameter of the output can be defined only with the knowledge of the parameter of the input, the value "1" can be entered at the appropriate point in the dependence matrix. In the event that the parameter of the output can be defined without knowledge of the parameter of the input, the value "0" is instead provided at the appropriate point of the dependence matrix. During the construction of a dependence matrix of this type, in addition to physical dependencies of parameters, it is also possible for plant technical specialist knowledge and standards and conventions to be taken into account.

Advantageously, a parameter value that is ascertained during the initialization of the component for an output, or which is input, is used for the initialization of a further component whose input is connected downstream of the associated output.

With reference to the simulation system for an industrial plant containing a number of components, whose components are classified into a number of component types, the object is achieved, according to the invention, by a storage module in which a dependence matrix describing a component-type-specific signal flow structure is stored for each component type of the industrial plant, and by a computer module in which it is determined for each of the number of output which parameter cannot be derived from other parameters to be fed to the component and in which it is specified a parameters input to be requested only for those parameters of each of the numbers of outputs which cannot be derived from other parameters to be fed to the component.

In this case, the signal flow structure is expediently stored in the storage module in the form of the dependence matrix.

The dependence matrix can also be built up in two stages. In this case, in a first stage it is established in the form of a matrix of what physical inputs and outputs the component has and how these are connected to each other. Here, a physical input or output is to be understood as a unit characterized using a medium flow and determined by a multiplicity of process parameters. For example, a "blower" component has as physical output an output for a gas flow, which is defined by the process parameters mass flow, temperature and enthalpy. These process parameters can be combined to form a parameter set that is characteristic of the physical output. In the first stage of the associated dependence matrix it is in this case established to which physical inputs the physical output is connected.

In the case of the two-stage building up of the dependence matrix, in the second stage an item of information about the associated process parameters is stored for each physical input and output. In their totality, the two stages of the dependence matrix built up in two stages thus have the same information content as a single-stage dependence matrix which is related directly to the process parameters.

The advantages achieved with the invention reside in particular in the fact that as a result of the requirement of a parameter input only following the checking of the component-type-specific signal flow structure, redundant or multiple parameter inputs are avoided. Any inconsistency in the parameter inputs is thus particularly reliably avoided, with the result that the initialization method is particularly reliable.

In addition, the effort during the parameter input is particularly low. The initialization method is recursively analytical and non-numerical, so that no convergence problems occur.

The initialization method makes a logically directed parameter input possible in the sense of a signal-oriented screening. For the case in which, for the parameter of the output of a component, it is recognized that the parameter is completely determined by parameters at the inputs to the component, it is specifically possible for the parameters at the inputs to be ascertained and initialized immediately.

To this end, for each component input to be described in this way, it is possible for the output that is connected to the latter, from the component connected upstream, to be ascertained in the manner of signal tracking. The parameter that is present there can in this case be initialized as required directly, either by a parameter input or—in the case of its complete determination by parameters at the inputs to the component—by further signal tracking. It is thus ensured that, for the initialization of a parameter, all the necessary items of information are available at the output of the component.

An initialization of this type can be used equally well for a simulation of an industrial plant or else for a simulation only of a partial system of an industrial plant.

Other features which are considered as characteristic for the invention are set forth in the appended claims.

Although the invention is illustrated and described herein as embodied in a method of initializing a simulation of the behavior of an industrial plant, and simulation system for an industrial plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
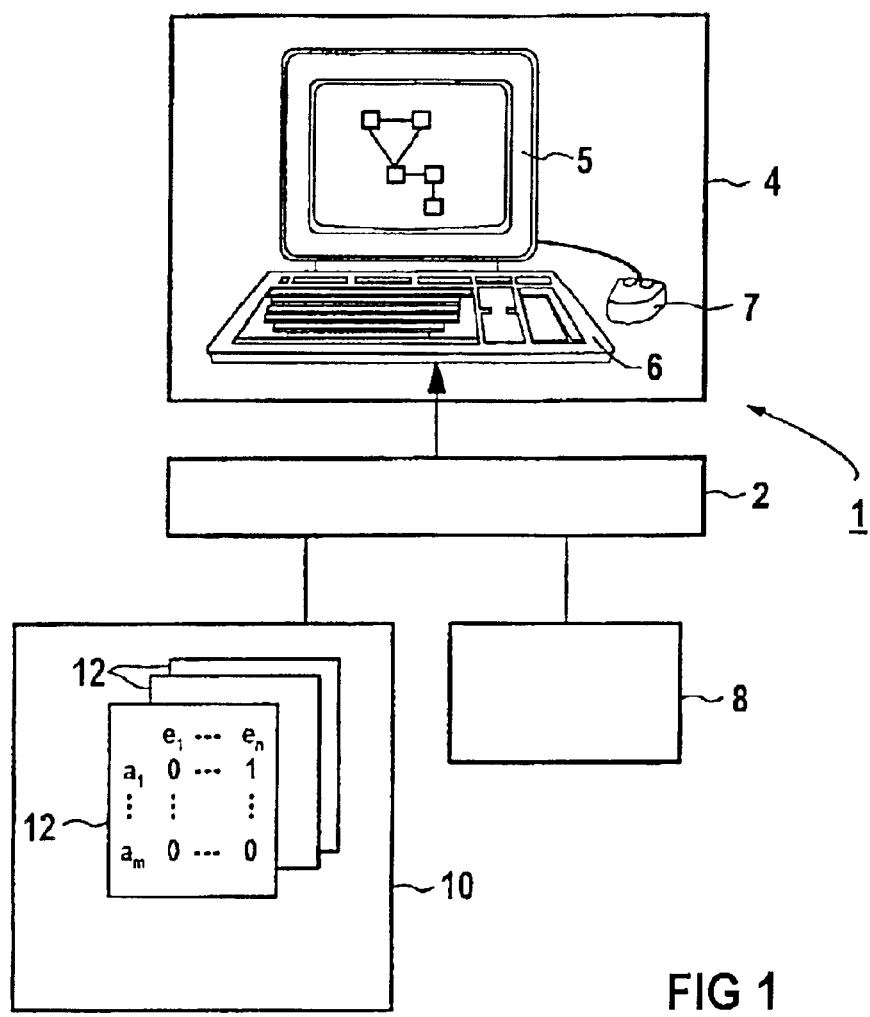
FIG. 1 is a diagrammatic, block diagram of a simulation system for an industrial plant according to the invention.

In all the figures of the drawing, sub-features and integral parts that correspond to one another bear the same reference symbol in each case. Referring now to the figures of the drawing in detail and first, particularly, to FIG. 1 thereof, there is shown a simulation system 1 containing a computer module 2, to which an input/output unit 4 is connected. Provided as the input/output unit 4 in the exemplary embodiment is a terminal with a screen 5 as an output medium and a keyboard 6 and a mouse 7 as input media. The computer module 2 is further connected to a first storage module 8 and to a second storage module 10.

The simulation system 1 serves for the simulation of the behavior of an industrial plant that contains a number of components but is not illustrated in more detail. In the exemplary embodiment here, a partial system of a power station plant is provided as the industrial plant. It may also be arbitrarily any other industrial plant. The components of the industrial plant are subdivided into component types.

The components of one component type in this case have comparable circuit properties. For example, the power station plant normally contains a large number of heat exchangers as components. In the simulation, each heat exchanger is recognized as belonging to the component type "heat exchanger", and accordingly integrated or defined in circuit terms.

In circuit terms, each component type is characterized by a number of inputs and by a number of outputs for one parameter in each case. For example, a heat exchanger normally has a primary medium flowing through it, whose heat is transferred to a secondary medium likewise flowing through the heat exchanger. In circuit terms, a heat exchanger thus has inputs for the parameters characterizing the medium flows flowing in. These parameters may be, for example: temperature, pressure and mass flow of the primary medium, and temperature, pressure and mass flow of the secondary medium. In a similar way, the heat exchanger has, in circuit terms, outputs for the following parameters: temperature, pressure and mass flow of the out flowing primary medium, and temperature, pressure and mass flow of the out flowing secondary medium.

According to the example cited, therefore, the component type "heat exchanger" is completely characterized in circuit terms by six inputs and by six out puts.

For each component type, a component-type-specific signal flow structure is stored in the second storage module 10 in the form of a dependence matrix 12. Each of the dependence matrixes 12 represents in its columns the inputs and in its rows the outputs of the component type on which it is based. In the respective dependence matrix 12 it is recorded, for each output from the respective component type, whether its parameter is completely defined by the parameters at the inputs of the respective component type. This is identified by the value "1" in the respective dependence matrix 12.

Neglecting any leakage rate, it is required, for example for a heat exchanger, that the mass flow of the primary medium at the outlet of the heat exchanger is equal to the mass flow of the primary medium at the inlet of the heat exchanger. In this case, therefore, the parameter at the output "mass flow of the primary medium" of the component type "heat exchanger" is completely defined by the parameter at the input "mass flow of the primary medium" of the component type "heat exchanger". The dependence matrix 12 of the component type "heat exchanger" therefore has the value "1" at the appropriate point.

Figure 2:
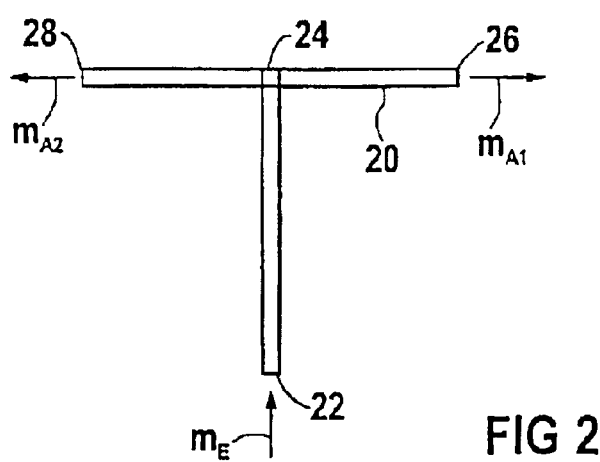
FIG. 2 is an illustration of a component of the industrial plant.

In order to explain the structure of the dependence matrix 12 in more detail, a line T piece 20 is shown schematically as a component in FIG. 2. The line T piece 20 has an input 22, a branching point 24 and outputs 26, 28. A medium, for example a fluid, can be fed to the input 22 of the line T piece 20. In this case the medium flow is characterized by a mass flow $m_E$ at the input 22 to the line T piece 20. At the branching point 24, the mass flow $m_E$ is split into a first partial mass flow $m_{A1}$ and a second partial mass flow $m_{A2}$. The first partial mass flow $m_{A1}$ leaves the line T piece via the output 26, whereas the second partial mass flow $m_{A2}$ leaves the line T piece 20 via its output 28. The subdivision of the inflowing mass flow $m_E$ into the partial flows $m_{A1}$, $m_{A2}$ is in this case defined by a line-specific branching ratio.

The line T piece 20 can be identified as belonging to the component type "T piece". For this component type, the boundary condition applies that the sum of the outflowing partial flows $m_{A1}$, $m_{A2}$ must be equal to the inflowing mass flow $m_E$. In order to describe in circuit terms the behavior of a component of the component type "T piece" completely, all that is required is thus the statement of the inflowing mass flow $m_E$ and one of the two outflowing partial flows $m_{A1}$ or $m_{A2}$. The respective other outflowing partial flow $m_{A2}$ or $m_{A1}$ is then already completely defined. As an alternative, the statement of the two outflowing partial flows $m_{A1}$ and $m_{A2}$ would also be sufficient. In this case, the inflowing mass flow $m_E$ is completely determined on grounds of consistency.

These circuit properties of the component type "T piece" are reflected in the associated dependence matrix 12. Since the component type "T piece" has one parameter input, namely for the inflowing mass flow $m_E$, and two parameter outputs, namely for the outflowing partial flows $m_{A1}$ and $m_{A2}$, the dependence matrix associated with the component type "T piece" contains one column and two rows.

Stored in the associated dependence matrix 12, as information in circuit terms, is the fact that the parameter of one of the two outputs is completely determined by stating the parameter of the other output and the parameter of the input. In this case, it is possible to incorporate as a convention that the parameter of the first output is to be entered, whereas the parameter of the second output is determined from the data entered and available at the input.

Accordingly, the associated dependence matrix 12 has the structure $$\begin{pmatrix} 0 \\ 1 \end{pmatrix}.$$

The "1" in the lower row of the dependence matrix 12 states that the parameter of the output represented by this row is completely defined by parameters of other inputs and/or outputs of this component type. Hence, an input of the parameter is not required. However, the parameter of the input is needed for its initial calculation. On the other hand, the "0" in the upper row of the dependence matrix 12 states that the parameter of the input is not needed in order to calculate the parameter of the associated output. Instead, the entry of the parameter is required.

Figure 3:
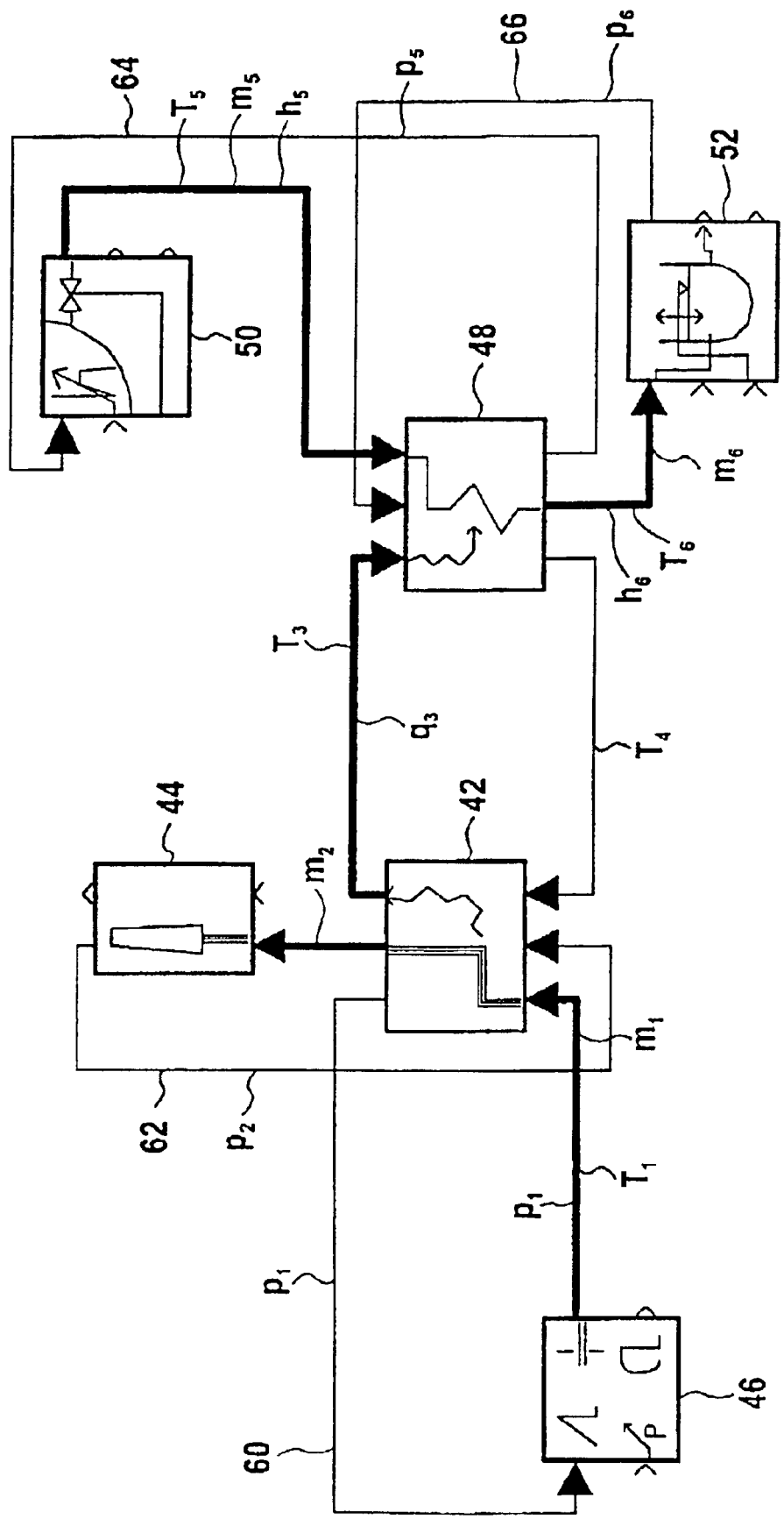
FIG. 3 is a block diagram of a partial system of the industrial plant containing a number of components.

A partial system 40 of the power station plant is illustrated in schematic form and in circuit terms in FIG. 3. The partial system 40 contains, as components, a flue-gas duct 42, downstream of which a chimney 44 is connected. An air inlet throttle 46 connected upstream of the flue-gas duct 42, and a preheating surface 48 disposed in the flue-gas duct 42 are further provided as components of the partial system 40. A fluid source 50 is connected upstream of the preheating surface 48, and a fluid reservoir 52 is connected downstream of the preheating surface 48, as further components of the partial system 40. In circuit terms, the components mentioned interact in the below mentioned manner.

Starting from the air inlet throttle 46, a flue-gas flow flows towards the flue-gas duct 42. The flow is characterized by a temperature $T_1$, a mass flow m1, and a pressure p1. The pressure p1 is for its part determined by properties of the flue-gas duct 42, which is indicated by the arrow 60.

Starting from the flue-gas duct 42, a waste-gas flow flows to the chimney 44. This flow is defined by a mass flow $m_2$. Starting from the chimney 44, a pressure $p_2$ acts on the flue-gas duct 42 as a further variable, which is indicated by the arrow 62.

In the flue-gas duct 42, heat is transferred from the flue gas to a medium flowing in the preheating surface 48. The heat transfer is characterized by a quantity of heat $q_3$ and a temperature $T_3$. In addition, a temperature $T_4$ proceeding from the preheating surface 48 for its part influences the behavior of the media in the flue-gas duct 42.

The quantity of heat $q_3$ is transferred to a medium supplied to the preheating surface 48. The medium is conveyed from the fluid source 50 into the preheating surface 48, the medium flow being characterized by its temperature $T_5$, its mass flow $m_5$ and its enthalpy $h_5$. The behavior of the fluid source 50 is for its part influenced by a pressure $p_5$ between the preheating surface 48 and the fluid source 50, which is indicated by the arrow 64.

Starting from the preheating surface 48, preheated fluid flows to the fluid reservoir 52. The associated medium flow is characterized by a temperature $T_6$, a mass flow $m_6$ and an enthalpy $h_6$. The properties of the preheating surface 48 are for their part in turn influenced by a pressure $p_6$ between the preheating surface 48 and the fluid reservoir 52, which is indicated by the arrow 66.

During the initialization of the simulation of the partial system 40, a large number of parameters thus have to be input. In order to keep the effort required for this particularly low, and to avoid inconsistencies, in each case a component type is firstly identified in the simulation system 1 for each component. Using the component-type-specific signal flow structure stored in the storage module 10, it is specified for the parameter of each output of a component whether a parameter input is requested. To this end, the respective dependence matrix 12 stored in the storage module 10 is used.

For instance, in the case of initializing the preheating surface 48, its component type is identified first. In this case the component type is ascertained by a comparison with a number of model types stored in the storage module 8. Here, it is established for the preheating surface 48 that it is a component of the component type "heating surface". A component of the component type "heating surface" is flowed through by a medium and thus has an input and an output for the medium. The description of the associated medium flow can, as shown in FIG. 3, be performed using the parameters temperature, mass flow and enthalpy. Accordingly, inputs and outputs for these parameters are provided for this component type.

The mode of action of a component of the component type "heating surface" is further determined by its interaction with the flue-gas duct 42. The interaction can be described by use of the heat flow $q_3$ and the temperature $T_3$. Accordingly, the component type "heating surface" has in each case an input for the parameters heat flow and temperature. Furthermore, an input for the pressure $p_6$ and an output for the temperature $T_4$, and a further output for the pressure $p_5$ are provided.

For the parameter of each output, it is specified whether a parameter input is requested during the initialization of the preheating surface 48 or not. When specifying this, the basis used as the component-type-specific signal flow structure is the dependence matrix 12 stored for the component type "preheating surface". Stored in the corresponding dependence matrix 12, in encoded form for each output, is information as to whether the associated parameter is completely determined by the parameters at the inputs. If this is so, then no parameter input is requested for the parameter at the respective output.

For example, for the mass flow $m_6$ it is recognized that the latter, neglecting a leakage rate, must be equal to the mass flow $m_5$ fed to the preheating surface 48. Without taking further variables into account, the mass flow $m_6$ is thus completely determined by the mass flow $m_5$ present at the input. A parameter input of the mass flow $m_6$ is thus not required during the initialization of the preheating surface 48, and is accordingly not requested.

The enthalpy $h_6$ and the temperature $T_6$ of the fluid leaving the preheating surface 48 are in each case unique functions of the temperature $T_5$, mass flow $m_5$ and enthalpy $h_5$ of the medium fed to the preheating surface 48, as well as of the quantity of heat $q_3$ and of the temperature $T_3$. Thus, for the parameters $h_6$ and $T_6$, a parameter input is likewise not required during the initialization of the preheating surface 48, and is therefore not requested. This applies similarly to the parameters $T_4$ and $T_5$.

During the initialization of the preheating surface 48, it is thus established, using the associated dependence matrix 12, that the parameters of all the outputs are completely determined by the parameters of the inputs. It is thus possible to dispense with a parameter input. In this way, a redundant parameter input and any inconsistency that may possibly result therefrom during the initialization are reliably avoided.

In order to be able to complete the initialization of the preheating surface 48, however, the knowledge of the relevant parameters at the inputs is required. To this end, it is established which further component has its output connected upstream of the respective input. For example, for the temperature $T_5$, the mass flow $m_5$ and the enthalpy $h_5$ of the fluid supplied to the preheating surface 48, the fluid source 50 is identified as the relevant component connected upstream.

Before the initialization of the preheating surface 48 is finished, the initialization of the fluid source 50 connected upstream thereof is therefore performed first. In this case, the procedure is expediently the same as was presented for the preheating surface 48. In particular, it is established that the fluid source 50 is characterized by outputs for temperature $T_5$, mass flow $m_5$ and enthalpy $h_5$ of the medium to be fed to the preheating surface 48.

On the other hand, only one input for the pressure $p_5$ is provided for the fluid source 50. Using the dependence matrix 12 stored for the fluid source 50, it is established that the temperature $T_5$, the mass flow $m_5$ and the enthalpy $h_5$ are not completely defined by the parameters at the inputs of the fluid source 50, namely the pressure $p_5$. An input of the parameters is therefore required for an initialization. Thus, a parameter input for the temperature $T_5$, the mass flow $m_5$ and the enthalpy $h_5$ is requested during the initialization of the fluid source 50. The initialization of the fluid source 50 can in this case be completed, since the parameters at all the outputs of the fluid source 50 are defined by the parameter input. These parameters, following their input or calculation, are automatically also made available for the initialization of the preheating surface 48 connected downstream of the fluid source. The initialization of the preheating surface 48 can thus be continued.

All the components of the partial system 40 are initialized in a similar way. In the process, the construction in circuit terms of the components disposed one behind another is followed in the manner of a chained initialization. As a result of the selective requesting of a parameter input, in this case, with a particularly low outlay, redundancy in the parameter input and any inconsistency possibly resulting therefrom is avoided.

Figure 4:
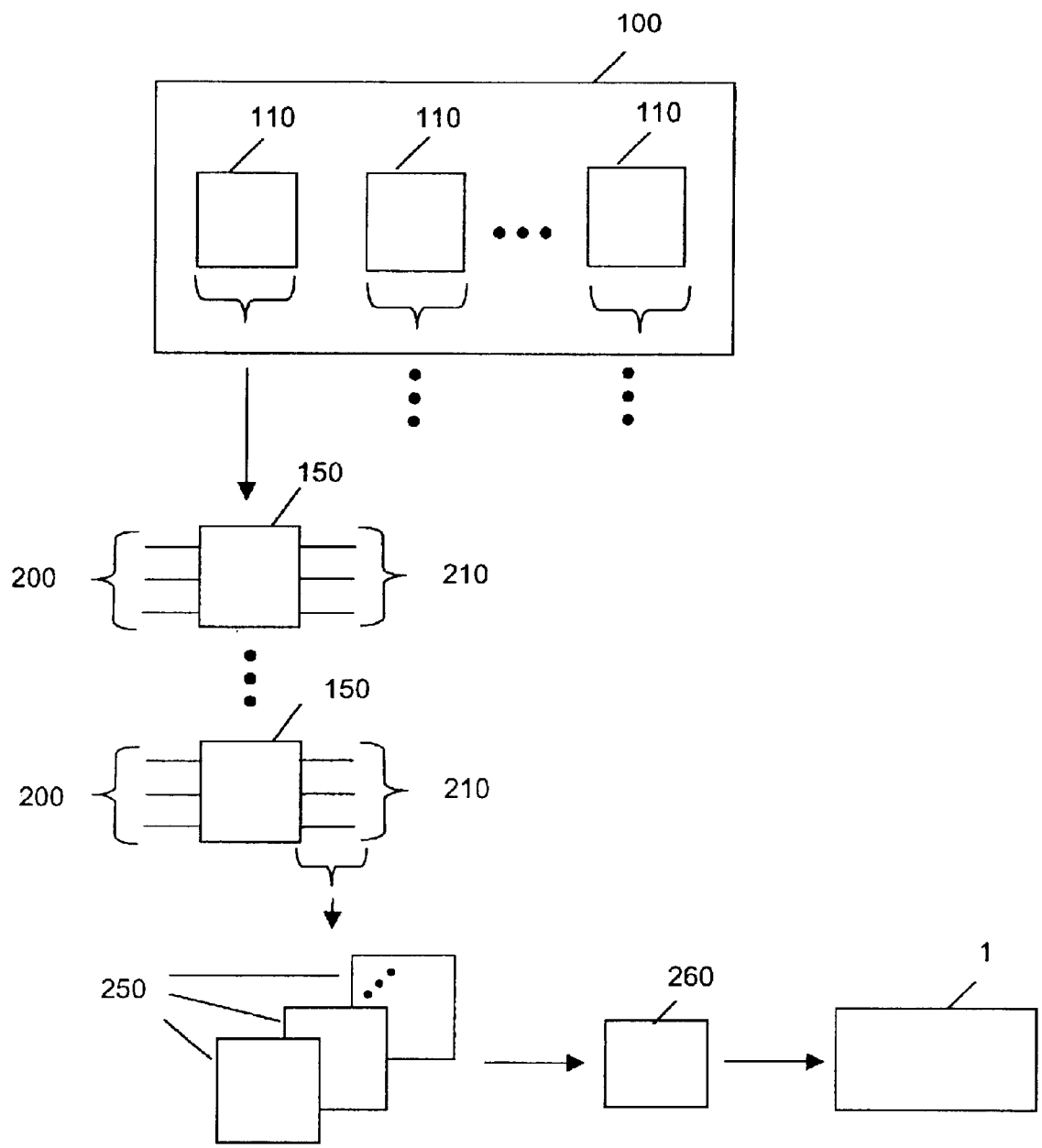
FIG. 4 is a schematic illustration of a industrial plant for the method according to the invention.

FIG. 4 shows an industrial plant 100, having a number of components 110. For each component 110, a component type 150 is identified. The component types 150 are defined in circuits terms by a number of inputs 200 and by number of outputs 210 for one parameter. A stored dependence matrix 250 describing a component-type-specific signal flow structure for a parameter of each of the number of outputs 210 is used to determine for each of the number of outputs which parameters cannot be derived from other parameters to be fed to the component. Only those parameters 260, which cannot be derived from the other parameters to be fed to the component are entered into a simulation systems 1 for finalization of a simulation.

Figure 5:
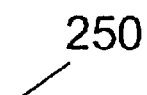
FIG. 5 is an illustration of a dependence matrix describing a component-type-specific signal flow structure.

An example for a dependence matrix 250 is shows in FIG. 5. Each vertical line of said dependence matrix represents an output 210*a*, 210*b*, . . . 210*m* and contains information which input parameters have to be inputted to calculate a value for the respective output. Lines 1 and 3 reveal, for example, that related outputs 210*a* and 210*c* are completely determined by input parameters 200*m* and 200*b*, respectively. Thus for simulation purposes, one has to enter only input parameters 200*m* and 200*b* for the calculation of outputs 210*a* and 210*c*, respectively.

I claim:

1. A method of initializing a simulation of a behavior of an industrial plant, which comprises:

identifying, for each component of an industrial plant having a number of components, a component type defined in circuit terms by a number of inputs and by a number of outputs for one parameter;

using a stored dependence matrix describing a component-type-specific signal flow structure for a parameter of each of the number of outputs to determine for each of the number of outputs which parameters cannot be derived from other parameters to be fed to the component; and entering only those parameters which cannot be derived from the other parameters to be fed to the component.

2. The method according to claim 1, which comprises using a parameter value ascertained during an initialization of the component for an output in an initialization of a further component having an input connected downstream of the output of the component.

3. The method according to claim 1, which comprises using a parameter value initially input during an initialization of the component for an output in an initialization of a further component having an input connected downstream of the output of the component.

4. The method according to claim 1, which further comprises providing the dependence matrix with a number of columns corresponding to the number of inputs of the component type and a number of rows corresponding to the number of outputs of the component type, and recording in the rows for each output of the component type whether the related output parameter is completely defined by the parameters at the inputs of the component type.

5. In combination with an industrial plant having a number of components classifiable into a number of component types, a simulation system for the industrial plant, the simulation system comprising:

a storage module storing a dependence matrix describing a component-type-specific signal flow structure for each component type of the industrial plant; and a computer module determining for each of the number of outputs which parameters cannot be derived from other parameters to be fed to the component and specifying a parameter input to be requested only for those parameters of each of the number of outputs which cannot be derived from other parameters to be fed to the component.

6. The simulation system according to claim 5, wherein said dependence matrix has a number of columns corresponding to the number of inputs of the component type and a number of rows corresponding to the number of outputs of the component type, said rows recording for each output of the component type whether the related output parameter is completely defined by the parameters at the inputs of the component type.

* * * * *